United States Patent [19]

Coast

[11] Patent Number: 4,961,395
[45] Date of Patent: Oct. 9, 1990

[54] AMPHIBIOUS VEHICLE WITH IMPROVED TRACK SECUREMENT AND GUIDE MEANS

[75] Inventor: John B. Coast, Baton Rouge, La.

[73] Assignee: Coast Machinery, Baton Rouge, La.

[21] Appl. No.: 300,620

[22] Filed: Jan. 23, 1989

[51] Int. Cl.⁵ .............................................. B60F 3/00
[52] U.S. Cl. ...................................... 114/270; 305/25
[58] Field of Search .................. 114/270, 343; 305/24, 305/25, 26, 27, 56; 180/9.1

[56] References Cited

U.S. PATENT DOCUMENTS

| | | | |
|---|---|---|---|
| 3,385,255 | 5/1968 | Raymond et al. | 114/270 |
| 3,760,763 | 9/1973 | Brusacoram | 114/270 |
| 3,842,785 | 10/1974 | Rivet | 114/270 |
| 3,951,093 | 4/1976 | Poche | 114/270 |
| 3,976,025 | 8/1976 | Russell | 114/270 |
| 4,433,634 | 2/1984 | Coast | 114/270 |

Primary Examiner—Sherman Basinger
Assistant Examiner—Stephen P. Avila
Attorney, Agent, or Firm—Pravel, Gambrell, Hewitt, Kimball & Krieger

[57] ABSTRACT

A multi-pontoon amphibious vehicle with an improved track securement and guide means for the track to prevent "track throw" or loss and minimize wear while operating at speeds of up to twenty miles per hour. The vehicle includes two spaced-apart parallel pontoons joined by a centrally located operator's platform structure, with each pontoon having a moveable endless cleated track for propulsion, with the track supported on its pontoon by fore and aft multiple sprocket wheel sets and a series of larger bogie wheels at its botton and guides at its top. Each track comprises a parallel set of continuous endless belts carrying a series of laterally disposed cleats with drive lugs, which lugs are engaged by the teeth of four sprockets wheels per track.

10 Claims, 5 Drawing Sheets

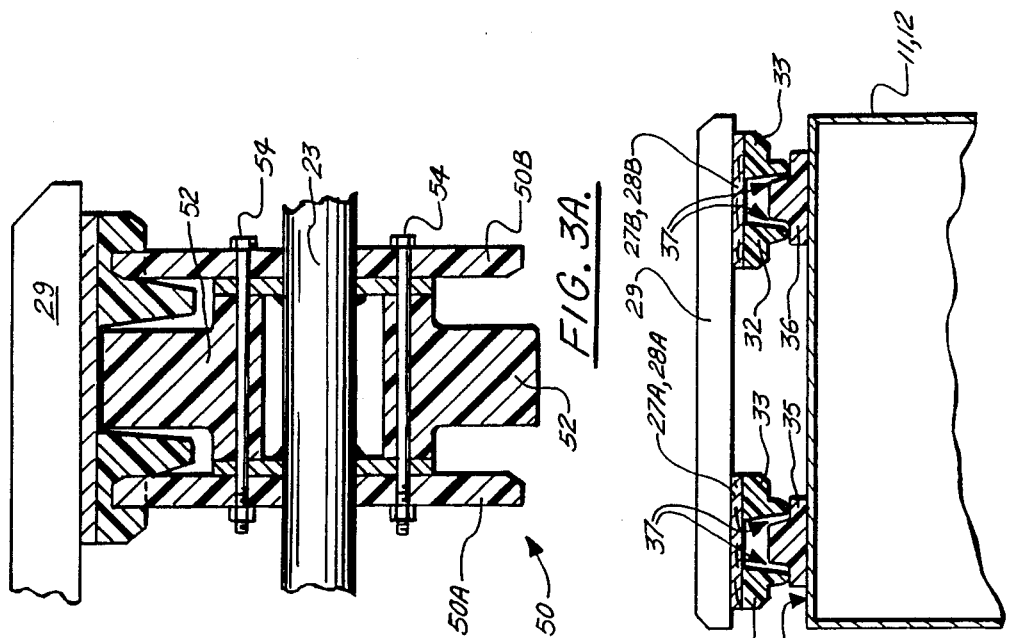
FIG. 3A.
FIG. 6.
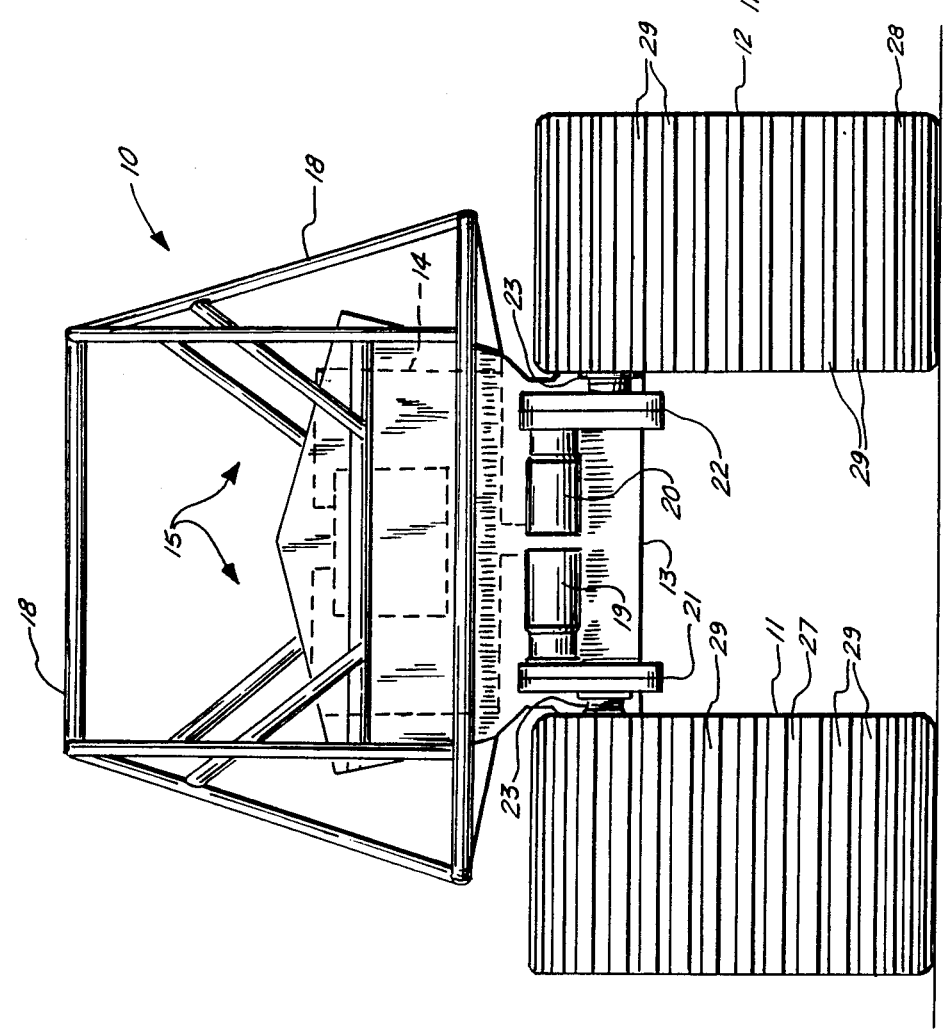
FIG. 2.

AMPHIBIOUS VEHICLE WITH IMPROVED TRACK SECUREMENT AND GUIDE MEANS

BACKGROUND OF THE INVENTION:

1. Field of the Invention:

The present invention relates to an amphibious, all terrain type vehicle (ATV), namely a marsh or swamp craft of the type having two spaced-apart elongated pontoons, and more particularly to an improved tracked amphibious marsh vehicle utilized for travel over different types of terrain, such as swamps, marsh and the like, and for travel cross-country with obstacles of different character, with various degrees of inclination and at relatively high operating speeds of, for example, twenty miles per hour.

2. General Background

Various amphibious craft and all terrain vehicles are known in the art. One commonly known and cited is U.S. Pat. No. 2,546,523, issued March 27, 1951, to Reynolds. The Reynolds patent describes a marsh buggy vehicle with a pair of spaced, elongated pontoons disposed and secured in a parallel relationship, two endless roller chains passing about each pontoon over sprockets mounted on transverse, driven shafts. The chains are joined together transversely by slats which form the treads or cleats for the craft. This type of marsh craft having spaced pontoons have enjoyed substantial commercial success as personnel carriers, and supporting working "uppers", such as draglines for construction of ditches, levees, etc. in a marsh environment. The spaced-apart, tracked pontoons enable the vehicle to turn easily, in a manner comparable to land-based tracked vehicles such as bulldozers and tanks, for example. However, the pontoons provide buoyancy to allow the vehicle to float when crossing open water.

An improved example of the Reynolds type of pontoon marsh vehicle is shown in U.S. Pat. No. 3,842,785, issued Oct. 22, 1974, to Rivet. The Rivet apparatus included two connected pontoons, with two endless drive chains carried in channels disposed on top and bottom of each pontoon. Cleats attached to the chains have plastic blocks which are secured to the web of the cleats and which are positioned to bear against the top and bottom of the pontoons such as when the machine hits a tree stump, thus preventing a bending of the cleats. A series of spaced, transverse I-beams and bulkheads in the bottom of the pontoon hull reinforced the pontoons for work in a treed swamp environment.

These and other similar vehicles using spaced-apart pontoons and roller chain have a number of operating problems, the most common of which is roller chain wear. In operation, the chain is exposed to abrasive mud and sand as well as water. In order to prolong the chain life, it is a common practice to lubricate the elements of the chain in places of connection. Any lubricant applied to a chain has a tendency to catch and collect dirt and sand, which causes rapid wear of the chain elements, particularly between the carrier roller and pin. Roller chain experiences substantial heat build-up at speeds greater than a few miles per hour (eg. 0-5 mph). Thus, roller chain machines are generally slow moving dinosaur-like monsters, typically most effective as work oriented machines supporting a crane, dragline, backline or the like where speed is a minimal need.

Some inventors have used rubber belts instead of metal chains, as for example in U.S. Pat. No. 3,217,687, issued Nov. 16, 1965, to Erkelson et al., which describes vehicle having a float-like body above the tracks provided for operation mainly in water when the drive belts are substantially submerged.

But some vehicles face another problem when traveling on the ground, this problem being commonly known as "chain throw" or "track throw," which arises from the inability of many such designs to provide efficient means for securing a chain or a belt in its place over the driving sprockets or wheels.

Additionally, many "marsh buggies" have had the problem of "track sag," which further adds to the problem of track throw.

These problems have been known in the art for along period of time and, to prevent rapid wear of the elements, a number of solutions have been suggested. In some cases, special pads are attached to the sides of a chain in order to reduce friction and thus to eliminate the problem. While these and other solutions have proven to be satisfactory to some extent, they sill have not provided full reliability.

A recent patent directed to an improved tracked, amphibious vehicle with track securement and guide means is U.S. Pat. No. 4,433,634, issued to John B. Coast, applicant herein. The Coast '634 patent provides a pontoon type amphibious vehicle using bogie wheels and an endless driven belt. The belt carries cleats and sprockets drive the belts. A belt retention system includes lugs on the inner surface of the belts which are located to prevent the belt from moving off its longitudinal center by engaging the inner surface of the bogie wheels. The present invention provides an improvement to the vehicle shown and described in the Coast U.S. Pat. No. 4,433,634 which is incorporated herein by reference.

Other prior patents showing exemplary amphibious type vehicles are listed below:

| U.S. Pat. No. | Patentee(s) | Issue Date |
|---|---|---|
| 2,068,664 | J. A. Dorst | 01/26/37 |
| 2,404,489 | J. M. Hait | 07/23/46 |
| 2,487,397 | B. A. Swennes | 11/08/49 |
| 3,108,564 | H. L. Prosser | 10/29/63 |
| 3,299,849 | A. H. Pitchford | 01/24/67 |
| 3,418,961 | F. B. Gregg | 12/31/68 |
| 3,474,751 | M. E. Hebert | 10/28/69 |
| 3,487,802 | L. H. Roy | 01/06/70 |
| 3,611,979 | M. E. Hebert | 10/12/71 |
| 3,760,763 | A. V. Brusacoram | 09/25/73 |

BRIEF DESCRIPTION OF THE DRAWINGS:

For a further understanding of the nature, objects, and advantages of the present invention, reference should be had to the following detailed description, taken in conjunction with the accompanying drawings, in which like reference numerals denote like elements, and wherein:

FIG. 2 is a rear elevational view of the preferred embodiment of the apparatus of the present invention;

FIG. 3A is a fragmentary view of the preferred embodiment of the apparatus of the present invention;

FIG. 6 is a sectional view taken along lines 6—6 of FIG. 1.

DETAILED DESCRIPTION OF THE PREFERRED EMBODIMENT

Figure 1:
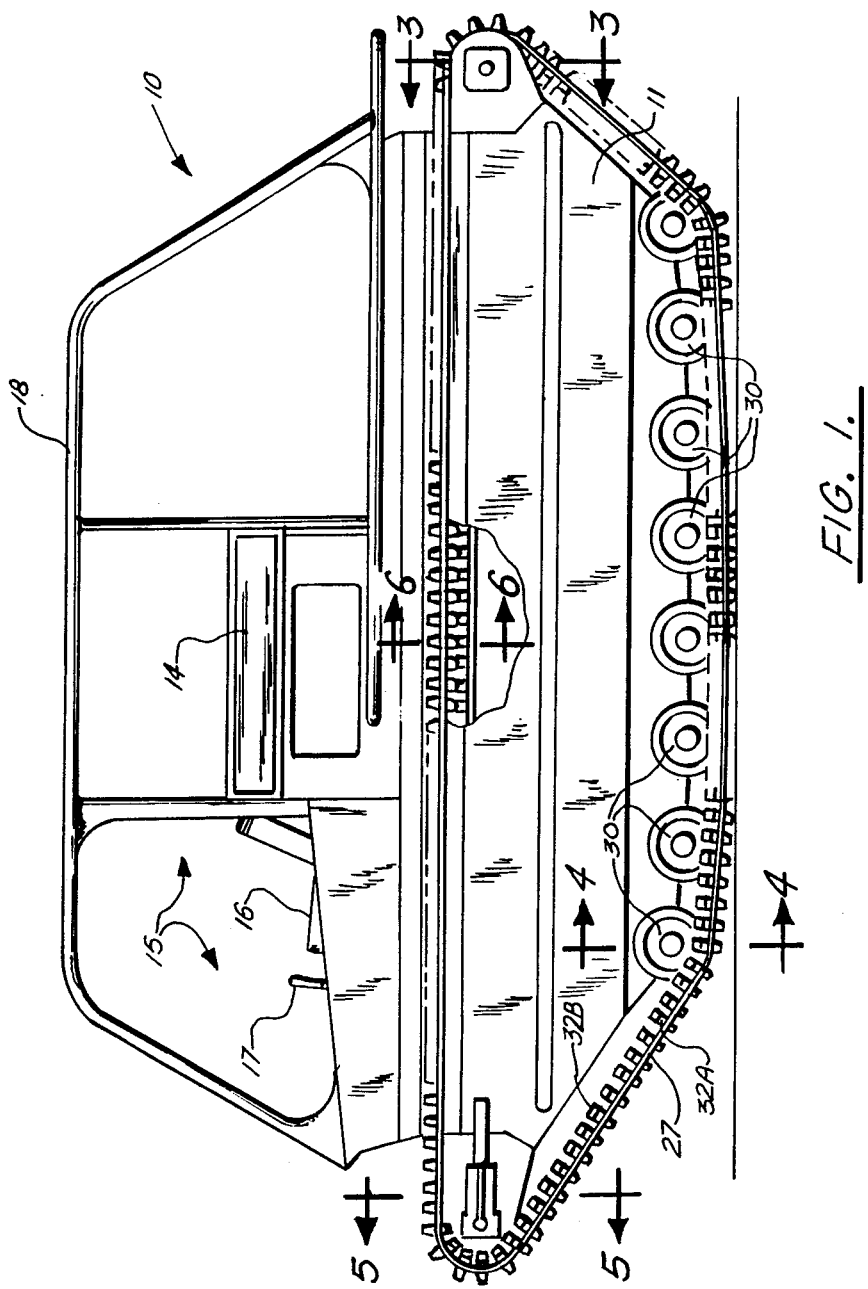
FIG. 1 is a side, elevational view of the preferred embodiment of the apparatus of the present invention.

FIGS. 1 and 2 provide overall side and rear elevational views of the preferred embodiment of the apparatus of the present invention designated generally by the numeral 10. Amphibious craft 10 has a pair of spaced apart elongated longitudinally extending pontoons 11, 12 connected by a central platform 13 formed of I-beams, channel beans, or other structural metal framing members for example. Pontoons 11, 12 include a generally air tight closed wall structure defined by side walls 11A, 12A and 11B, 12B and Top walls 11C, 12C and bottoms 11D, 12D. The platform 13 carries an engine or like power source 14 and can have a personal area or cabin 15 with one or more seats 16. A tiller 17 steers the vehicle 10. A roll cage 18 protects the operator (not shown) and the engine 14 during rollover, and from brush during transit through thick underbrush. The power source 14 drives a pair of hydrostatic transmissions 19, 20 that connect via gear reducers 21, 22 or like means respective to left and right drive shafts 23 which carry drive sprockets 25 A,B,C,D.

Figure 4:
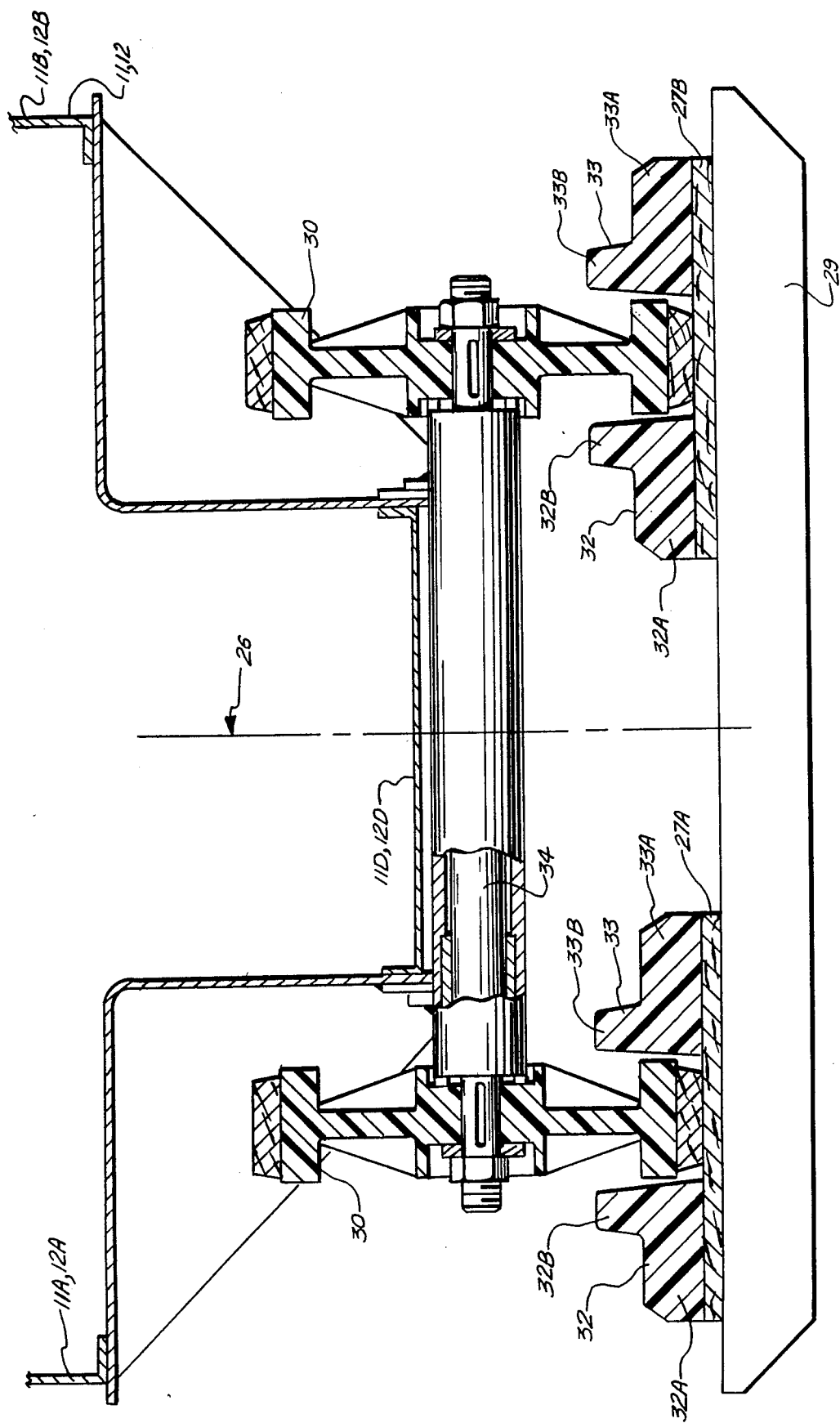
FIG. 4 is a sectional view taken along lines 4—4 of FIG. 1.
Figure 5:
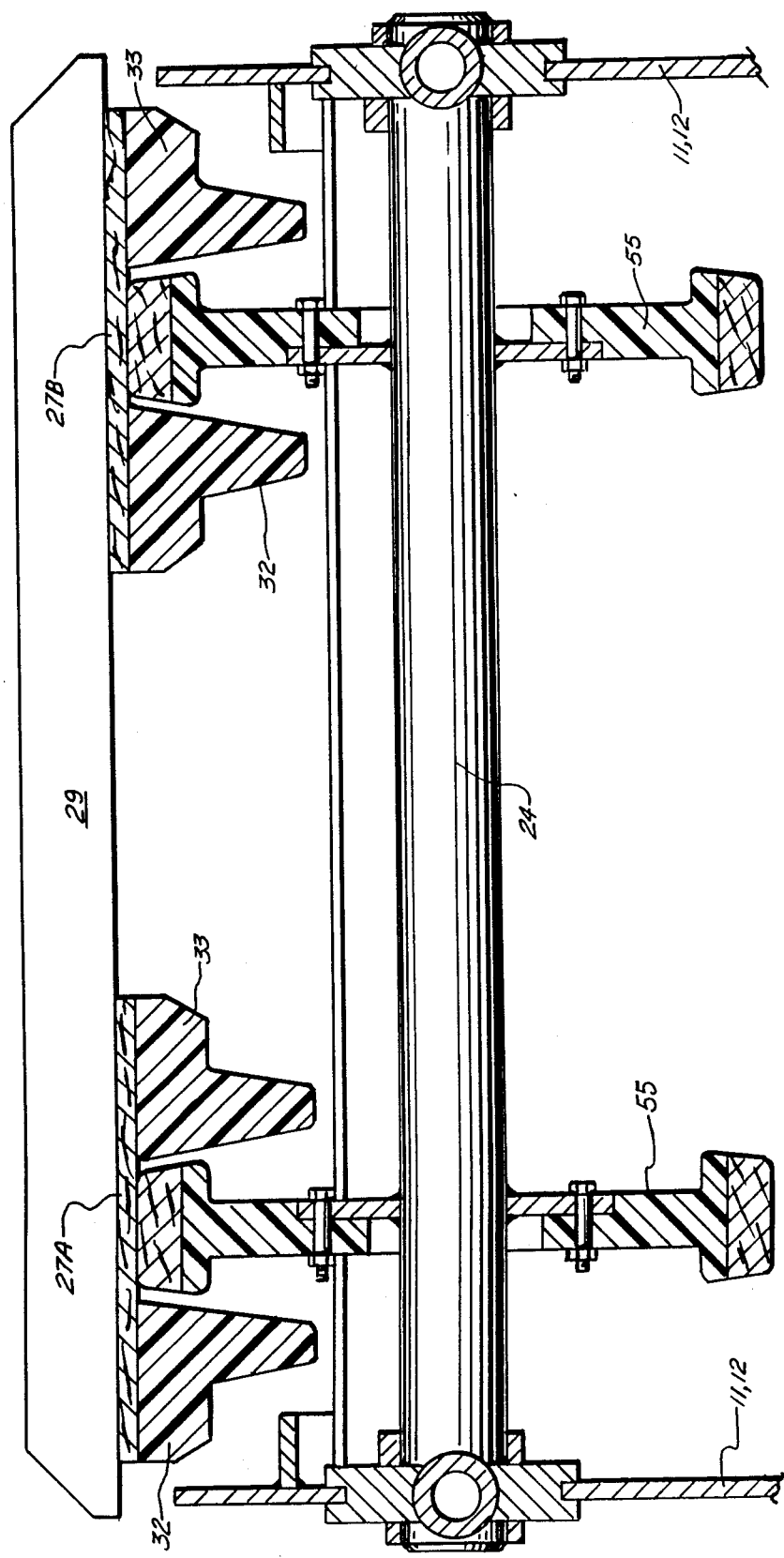
FIG. 5 is a sectional view taken along lines 5—5 of FIG. 1.

A series of longitudinally spaced bogie wheels 30 support the vehicle, the wheels 30 being rotatably mounted upon shafts 34 at the bottom area of each of the pontoons 11, 12 in position on opposite respective sides of the longitudinal centerline of the pontoon as shown in FIG. 4. Wheels 55 mounted upon shafts 24 are used as take up idlers for tracks 27, 28 at the top respective front portions of each pontoon 11, 12 (FIG. 5).

A moveable continuous endless track 27, 28 is provided for each pontoon 11, 12 respectively, each track 27, 28 encircling its respective pontoon 11, 12 in tracking engagement with the plurality of bogie wheels 30 supplied to each pontoon 11, 12 and positioned on both sides of each pontoon 11, 12 centerline 26. Each track 27, 28 can be in the form of a pair of reinforced rubber belts 27A, 27B (FIG. 4) ground engaging cleats 29 are carried by the tracks 27, 28 for providing traction of the vehicle 10 as the endless tracks 27, 28 move with respect to the pontoons 11, 12. As can be seen from an inspection of FIG. 4, the cleats 29 can form a connection laterally between the track sections 27A, 27B, and 28A, 28B. A drive shaft 23 is mounted on one end of each one of the pontoons 11, 12 and is connected to each endless drive track 27, 28 for driving the track 27, 28 with the plurality of sprockets 25A-25D.

Figure 3:
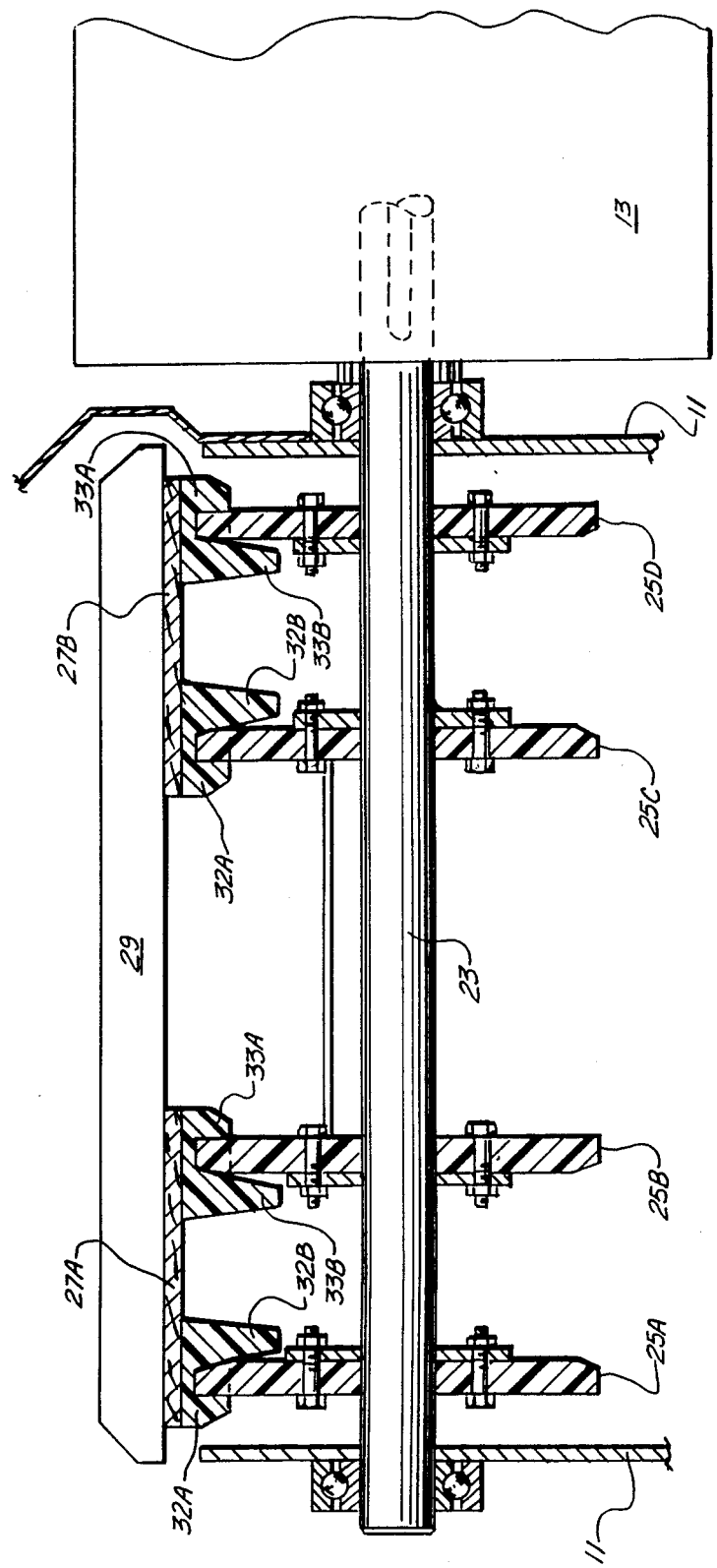
FIG. 3 is a sectional view taken along lines 3—3 of FIG. 1

Each shaft 34 is made sufficiently short so that bogie wheels 30 can be positioned inboard of the sides 11A, 11B and 12A, 12B of pontoons 11, 12 (see FIG. 4). By positioning the bogie wheels 30 inboard of pontoon sides 11A, 12A and 11B, 12B, a pair of lugs 32, 33 can be positioned respectively on each side of each bogie wheel 30. Thus the lugs 32, 33 form a track retention system with bogie wheels 30 for each pontoon 11, 12 and its associated track 27, 28. The lugs 32, 33 are positioned on both sides of each series of bogie wheels 30, the lugs also defining a load transfer between the sprockets 25A-D and the tracks 27, 28. Each lug 32, 33 includes preferably a solid block of material such as a high density plastic such as urethane, for example, and each lug 32, 33 includes an arcuate section 32A, 33A which is generally semicircular in cross section and is shaped to register with and intermesh with each sprocket 25A-25D (see FIG. 3), and a guide portion 32B, 33B which extends inwardly a distance beyond the curved portion 32A as shown in FIGS. 1, 3, and 4. The top 11C, 12C of each pontoon is provided with a pair of longitudinally extending rails 35, 36. Lugs 32, 33 register upon the rails 35, 36 as shown in FIG. 6. Each rail includes a longitudinally extending indented portion 37 along its inside and outside edges as shown in FIG. 6, the indented portion registering with the guide 32B, 33B portions of lugs 32, 33. Rails 35, 36 can be manufactured of a plastic material having a low coefficient of friction. Alternately a series of idler support wheels can be used in place of rails 35, 36.

In the embodiment of FIG. 3A, the drive shafts 23 is connected to sprocket assembly 50 which includes a pair of sprocket members 50A, having guide wheel 52 therebetween. The assembly 50 can be bolted together for example using a plurality of bolted connection 54.

In view of the numerous modifications which could be made to the preferred embodiments disclosed herein without departing from the scope or spirit of the present invention, the details herein are to be interpreted as illustrative and not in a limiting sense.

What is claimed as invention is:

1. A tracked, amphibious vehicle, comprising;
   (a) at least two, spaced, elongated pontoons disposed at least generally parallel to one another each pontoon having generally flat vertical outer sidewalls;
   (b) a platform structure supported by and extending between the pontoons;
   (c) power means for propelling the vehicle, associated and supported at least in part by said platform;
   (d) a series of longitudinally extending spaced bogie wheels for supporting said vehicle, including left and right sets of bogie wheels and mounted at the bottom area of and under each one of said pontoons and positioned along respective left and right longitudinal lines on opposite respective sides of the longitudinal centerline of each of said pontoons;
   (e) a moveable, continuous, endless track assembly for each pontoon, each track encircling its pontoon in tracking engagement with its bogie wheels;
   (f) the track assembly including a plurality of spaced ground engaging cleats carried by the track for providing traction for the vehicle as the endless tracks move with respect to the pontoons the cleats extending laterally to a position defined by the plane of the pontoon sidewalls;
   (g) driveshaft means mounted on at least one end of each one of said pontoons and connected to said power means for driving its respective endless track;
   (h) a plurality of sprockets mounted for rotation on the driveshaft means for engaging the track of each pontoon; and
   (i) a track retention system for reach said pontoon comprising means including a plurality of spaced lugs carried respectively by a plurality of the spaced cleats, the plurality of lugs including lugs positioned laterally on both sides of each series of bogie wheels, and under the pontoons for transferring load between the sprockets and the track.

2. The apparatus of claim 1 wherein the lug means includes rows of longitudinally aligned lugs and there are a corresponding number of sprockets and rows of lugs.

3. The apparatus of claim 2 wherein there are four laterally spaced sprockets and four rows of lugs on each pontoon.

4. A tracked, amphibious vehicle having a longitudinal centerline, comprising:
   (a) at least two, longitudinally extending, elongated, spaced apart pontoons having pontoon and longitudinal centerlines disposed generally parallel to one another and to the vehicle centerline, each pontoon having a top, a bottom and laterally spaced sidewalls defining the width of each pontoon;
   (b) a platform structure supported by and structurally connecting the pontoons at their upper surface leaving a free clearance area under the platform and between the pontoons through which terrain can pass;
   (c) engine means for supplying power to propel the vehicle;
   (d) a pair of longitudinal rows of spaced bogie wheels having outermost, load bearing annular surfaces for supporting each pontoon of said vehicle, and mounted for rotation in a plane generally parallel to the pontoon sidewalls and spaced along the bottom of each of said pontoons and positioned laterally to each side of the centerline of each pontoon, each bogie wheel having inner and outer side surfaces;
   (e) a pair of continuous, endless belts encircling respectively each pontoon, engaging the outer, annular load bearing surfaces of the bogie wheels at a position inboard of the pontoon sidewalls;
   (f) means for transferring power between the engine means and the endless belts;
   (g) ground-engaging means assembled on the outer surface of each belt and substantially covering the pontoon bottom for providing traction to the vehicle;
   (h) the power transfer means including a plurality of sprockets for connecting the driving means to each of the continuous endless belts, including a sprocket positioned on opposite lateral sides of each longitudinal row of bogie wheels; and
   (i) a belt retention system including lug means connected to the inner surface of the belt and positioned on opposite sides of each row of bogie wheels to prevent the belt from moving off its longitudinal center by engaging both the inner and outer side surfaces of the bogie wheels when the belt moves laterally a predetermined distance.

5. The vehicle of claim 3 wherein the lug means comprises in part, said power transfer means.

6. The vehicle of claim 5 wherein the lug means comprises a plurality of rows of lugs and there is a corresponding plurality of drive sprockets longitudinally aligned respectively with each row of lugs.

7. The vehicle of claim 4, wherein said lug means are positioned inboard and outboard of said bogie wheels and interface respectively with both sides of said bogie wheels.

8. The vehicle of claim 4, wherein there is further included a plurality of guide wheels mounted on a top end portion of each pontoon which likewise at their sides interface said lug means.

9. The vehicle of claim 4, wherein said series of bogie wheels form pairs connected by axles.

10. The vehicle of claim 4, wherein there are four sprockets driving each belt and said track comprises,
   at least one flexible belt mounted for movement about the bottom and ends of its pontoon,
   a plurality of longitudinally spaced, ground engaging, transverse cleats extending across said endless belt, and
   a series of longitudinally spaced drive lug means rigidly attached to said endless belt for propulsive engagement with each sprocket.

* * * * *